United States Patent
Liu et al.

(10) Patent No.: US 12,181,448 B2
(45) Date of Patent: Dec. 31, 2024

(54) METHOD FOR CONTINUOUSLY SEPARATING COMPONENTS FROM A SAMPLE

(71) Applicants: IMEC VZW, Leuven (BE); Katholieke Universiteit Leuven, KU LEUVEN R & D, Leuven (BE)

(72) Inventors: Chengxun Liu, Heverlee (BE); Andim Stassen, Leuven (BE); Ying Ting Set, Heverlee (BE)

(73) Assignees: IMEC VZW, Leuven (BE); Katholieke Universiteit Leuven, KU LEUVEN R&D, Leuven (BE)

( * ) Notice: Subject to any disclaimer, the term of this patent is extended or adjusted under 35 U.S.C. 154(b) by 846 days.

(21) Appl. No.: 17/129,211

(22) Filed: Dec. 21, 2020

(65) Prior Publication Data

US 2021/0199623 A1    Jul. 1, 2021

(30) Foreign Application Priority Data

Dec. 27, 2019 (EP) .................................... 19219885
Feb. 28, 2020 (EP) .................................... 20159969

(51) Int. Cl.
*G01N 30/00* (2006.01)
*B01L 3/00* (2006.01)
*B03C 5/02* (2006.01)

(52) U.S. Cl.
CPC .... *G01N 30/0005* (2013.01); *B01L 3/502761* (2013.01); *B03C 5/024* (2013.01);
(Continued)

(58) Field of Classification Search
None
See application file for complete search history.

(56) References Cited

U.S. PATENT DOCUMENTS 6,761,811 B2    7/2004  Mariella
6,881,314 B1    4/2005  Wang
(Continued)

FOREIGN PATENT DOCUMENTS

WO    2009146143 A2    12/2009
WO    WO-2018009892 A1 *  1/2018   ............... B03C 5/00

OTHER PUBLICATIONS

Extended European Search Report and Written Opinion, EP Application No. 20159969.3, mailed May 12, 2020, 6 pages.
(Continued)

*Primary Examiner* — J. Christopher Ball
(74) *Attorney, Agent, or Firm* — McDonnell Boehnen Hulbert & Berghoff LLP

(57) ABSTRACT

A method for continuously separating components from a sample includes providing a field-flow fractionation device including: a channel coupled to a flow generator for translocating the sample components along the channel in a first direction, an actuator for translocating the sample components in a second direction, at an angle with the first direction, and an array of electrodes electrically or capacitively connected to an AC power source, operating the actuator so as to translocate the sample components in a second direction at an angle with the first direction, operating the AC power source so as to generate an AC electric field between adjacent rows, and operating the flow generator, collecting sample components from the sample outlets.

20 Claims, 8 Drawing Sheets

(52) U.S. Cl.
CPC ................ *B01L 2200/0647* (2013.01); *B01L 2300/0864* (2013.01)

(56) References Cited

U.S. PATENT DOCUMENTS

| | | |
|---|---|---|
| 6,936,151 B1 | 8/2005 | Lock |
| 6,958,245 B2 | 10/2005 | Seul |
| 8,287,712 B2 | 10/2012 | Nikolaev |
| 8,932,447 B2 | 1/2015 | Heller |
| 11,454,583 B2 | 9/2022 | Liu |
| 2004/0011651 A1 | 1/2004 | Becker et al. |
| 2006/0102482 A1 | 5/2006 | Auerswald et al. |
| 2006/0289341 A1 | 12/2006 | Muller et al. |
| 2011/0259745 A1* | 10/2011 | Dehlinger ............... B03C 5/005 204/547 |
| 2021/0205822 A1 | 7/2021 | Wakizaka |

OTHER PUBLICATIONS

Kang, Yuejun, and Dongqing Li. "Electrokinetic motion of particles and cells in microchannels." Microfluidics and nanofluidics 6, No. 4 (2009): 431-460.

\* cited by examiner

METHOD FOR CONTINUOUSLY SEPARATING COMPONENTS FROM A SAMPLE

CROSS-REFERENCE TO RELATED APPLICATIONS

The present application is a non-provisional patent application claiming priority to European Patent Application No. 20159969.3, filed on Feb. 28, 2020, and claiming priority to European Patent Application No. 19219885.1, filed on Dec. 27, 2019, the contents of both of which are hereby incorporated by reference.

FIELD OF THE DISCLOSURE

The present disclosure relates to a method for continuously separating components from a sample, and in particular by way of a field-flow fractionation.

BACKGROUND

Microfluidics has been widely and increasingly used in many applications such as diagnostics, therapy, and agriculture. In-vitro microfluidics processing is typically composed of sample preparation, reaction, and signal detection. Sample preparation and the biological assay require one or multiple separations, mixing, washing, enrichment, or dilution. Among a variety of sample preparation steps, separating sample components, such as bioparticles, is a frequent demand in many biological and medical applications, e.g. preparative bioparticle separation. Preparative bioparticle separation is essential to ensure enough purity of the bioparticle for downstream analysis such as protein assay or PCR. Preparative separation is traditionally done by filtering, centrifugation, or membrane dialysis by manual handling. Like traditional bioanalytical instruments, microfluidic systems also benefit from the integration of preparative bioparticle separation as opposed to off-chip manual preparation.

Sample components separation is usually a challenge for microfluidic sample preparation devices because of the intrinsically low throughput despite their potential advantages such as superior separation resolutions and rare sample addressability. Combining the high separation resolution and high throughput is an unmet need for microfluidic "preparative separation." One typical approach is the inclusion of a mechanical sieve to separate big particles from smaller ones (e.g., cell separation from serum). This is very efficient if the bioparticles-of-interest are distinct in size, especially if they are larger than other background particles. This approach is either unsuitable or very complicated if the sample components have medium sizes or if a spectrum of components of different sizes needs to be separated and collected. Also, the sieve structure often easily gets clogged.

Another approach is field-flow fractionation (FFF), where sample components are continuously separated in the direction (Y-direction) perpendicular to the feeding flow (X-direction). This approach separates the feeding flow from the separation physics, thereby allowing continuous separation of sample components and thus improving the throughput.

A shortcoming of regular FFF is that its separation resolution by unit of time is low. This has the negative consequence that the device size must be large.

Kang et al. (Microfluid Nanofluid 6: 431-460, 2009) discloses the application of FFF to DNA separation by size. Since the DNA electrophoretic mobility does not differ by DNA size, separating DNA by FFF requires either tagging DNA with neutral molecules such as proteins or configuring the separation matrix in a complex way (e.g. pH gradient or ion concentration gradient).

There is still a need in the art for a method for continuously separating components from a sample, addressing one or more of the above issues.

SUMMARY

It is a potential benefit of the present disclosure to provide methods and devices for the continuous separation of sample components.

In a first aspect, the present disclosure relates to a method for continuously separating components from a sample, comprising the acts of: providing a field-flow fractionation device comprising: an alternating current (AC) power source, a channel comprising a sample inlet and a plurality of sample outlets, a flow generator, coupled to the channel, for translocating the sample components along the channel in a first direction from the sample inlet to the plurality of sample outlets, an actuator, distinct from the flow generator, coupled to the channel, for translocating the sample components in a second direction, at a first angle with the first direction, an array of electrodes, distinct from the flow generator and from the actuator, being in a path taken by the sample components in the channel, arranged in a plurality of rows, electrically connected by electrical connections to the AC power source in such a way that adjacent rows can be set at different AC potentials and every other row can be set at a same AC potential, operating the AC power source to generate an AC electric field between adjacent rows to set them at different AC potentials while every other row is set at a same AC potential, operating the flow generator in such a way as to feed the sample to the sample inlet and cause the translocation of the sample components along the channel in the first direction from the sample inlet to the plurality of sample outlets, wherein the feeding continues at least until a part of the sample has already reached the array of electrodes, operating the actuator so as to translocate the sample components in the second direction, at the first angle with the first direction, collecting sample components from the sample outlets. The main acts of the method are depicted in FIG. 14.

In a second aspect, the present disclosure relates to a field-flow fractionation device for the continuous separation of sample components comprising: a channel comprising a sample inlet and a plurality of sample outlets, the channel being suitable for being coupled to a flow generator for translocating the sample components along the channel in a first direction from the sample inlet to the plurality of sample outlets, an actuator, which is not the flow generator, coupled to the channel, for translocating the sample components in a second direction, at a first angle with the first direction, an array of electrodes, which is not the flow generator, and which is distinct from the actuator, being in a path taken by the sample components in the channel, arranged in a plurality of rows, and comprising electrical connections for electrically connecting the array to an AC power source in such a way that adjacent rows can be set at different AC potentials and every other row can be set at the same AC potential, a controller coupled to the actuator and suitable for being additionally coupled to the AC power source, the controller being programmed to allow for the simultaneous operation of the actuator and the AC power source.

It is a potential advantage of embodiments of methods of the present disclosure that they allow continuous separation and hence a high throughput.

It is a potential advantage of embodiments of methods of the present disclosure that they may have a high separation resolution.

It is a potential advantage of embodiments of methods of the present disclosure that they may be used with a variety of samples, including samples comprising analytes close in size and/or of medium size.

It is a potential advantage of embodiments of methods of the present disclosure that they are relatively simple.

It is a potential advantage of embodiments of methods of the present disclosure that they may have a low clogging tendency.

It is a potential advantage of embodiments of methods of the present disclosure that they may provide a sample separation in a short time.

It is a potential advantage of embodiments of methods of the present disclosure that they can make use of relatively small devices.

It is a potential advantage of embodiments of methods of the present disclosure that they allow the separation of unmodified nucleic acids. For instance, the device does not require the attachment of tags to the nucleic acids.

It is a potential advantage of embodiments of methods of the present disclosure that no separation matrix needs to be present in the channel for the method to perform well. In particular, a separation matrix comprising a pH gradient, or an ion concentration gradient is not needed.

It is a potential advantage of embodiments of methods of the present disclosure that they may operate at relatively low power while nevertheless providing high resolution. Since the AC force field between adjacent electrodes belonging to neighboring rows of the array is very local, the local AC field strength and field gradient can be easily much higher than if a single bulk AC field was applied across the whole channel in the second direction by means of only two electrodes. Since every element of the array can be an electrode (e.g. a pillar electrode), the field strength is inversely proportional to the inter-electrode distance, easily leading to $10^6$ V/m for a 10 V potential difference whereas if a single bulk 10 V AC electric field had to be applied, the field strength would typically be inversely proportional to the channel width, often leading to $10^4$ V/m. For dielectrophoresis (DEP), such a hundred times higher field strength results in separation force which is 10,000 times higher. In other words, for the same separation efficiency, the method of embodiments of the first aspect might only require $1/10,000$ of the electric potential that might be required for a single bulk AC electric field.

It is an advantage of embodiments of methods of the present disclosure that they may be programmable. When the field array electrodes are grouped in two sets, or even individually addressed, the separation can be adjusted in a pre-programmed way or in real-time by adjusting the AC force field accordingly.

Aspects of the disclosure are set out in the accompanying independent and dependent claims. Features from the dependent claims may be combined with features of the independent claims and with features of other dependent claims as appropriate and not merely as explicitly set out in the claims.

The present concepts are believed to represent substantial novel improvements, including departures from prior practices, resulting in the provision of more efficient, stable, and reliable devices.

The above and other characteristics, features, and potential advantages of the present disclosure will become apparent from the following detailed description, taken in conjunction with the accompanying drawings, which illustrate, by way of example, the principles of the disclosure. This description is given for the sake of example only, without limiting the scope of the disclosure. The reference figures quoted below refer to the attached drawings.

BRIEF DESCRIPTION OF THE FIGURES

The above, as well as additional, features will be better understood through the following illustrative and non-limiting detailed description of example embodiments, with reference to the appended drawings.

Figure 1:
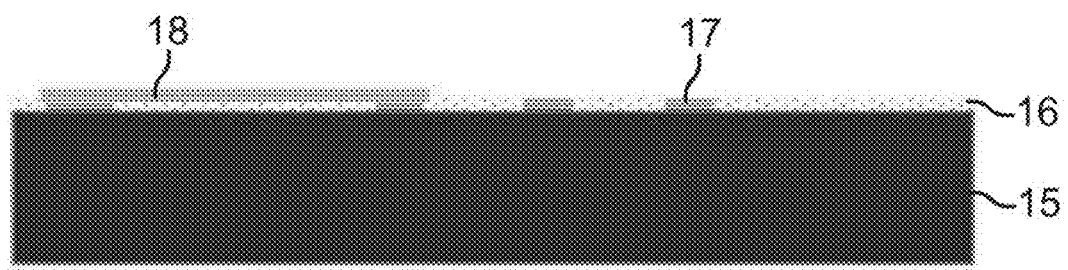
FIG. 1 shows a vertical cross-section of an intermediate structure for the construction of a device, according to an example embodiment.

In the different figures, the same reference signs refer to the same or analogous elements.

All the figures are schematic, not necessarily to scale, and generally only show parts which are necessary to elucidate example embodiments, wherein other parts may be omitted or merely suggested.

DETAILED DESCRIPTION

Example embodiments will now be described more fully hereinafter with reference to the accompanying drawings. That which is encompassed by the claims may, however, be embodied in many different forms and should not be construed as limited to the embodiments set forth herein; rather, these embodiments are provided by way of example. Furthermore, like numbers refer to the same or similar elements or components throughout.

The present disclosure will be described with respect to particular embodiments and with reference to certain drawings. The drawings described are only schematic and are non-limiting. In the drawings, the size of some of the elements may be exaggerated and not drawn to scale for illustrative purposes.

Furthermore, the terms first, second, third and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the disclosure described herein are capable of operation in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that the embodiments of the disclosure described herein are capable of operation in other orientations than described or illustrated herein.

Reference throughout this specification to "one embodiment" or "an embodiment" means that a particular feature, structure or characteristic described in connection with the embodiment is included in at least one embodiment of the present disclosure. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly, it should be appreciated that in the description of exemplary embodiments of the disclosure, various features of the disclosure are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this disclosure.

Furthermore, while some embodiments described herein include some but not other features included in other embodiments, combinations of features of different embodiments are meant to be within the scope of the disclosure, and form different embodiments, as would be understood by those in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the disclosure.

In the description provided herein, numerous specific details are set forth. However, it is understood that embodiments of the disclosure may be practiced without these specific details. In other instances, well-known methods, structures and techniques have not been shown in detail in order not to obscure an understanding of this description.

In a first aspect, the present disclosure relates to a method making use of an FFF device. An FFF device is a separation device where a field is applied to a sample liquid moved through a channel, the field being at an angle different from zero (typically perpendicular) to the direction of sample liquid movement, thereby causing separation of the components present in the sample liquid.

The method of the first aspect is suitable for the continuous separation of sample components. Most separation methods currently available function batch-wise. Batch-wise operation means that a sample is typically introduced in its entirety in the device before the separation process starts in order to avoid a composition overlap between the collected fractions, i.e. a loss of resolution. The fact that, in the present disclosure, the method is suitable for the continuous separation of sample components, means that the sample can still be loaded in the device while the separation process is already ongoing without impact or with a limited impact on the resolution of the separation. This has for consequence that the sample can be continuously loaded, and the sample components can be continuously separated at the same time.

The feeding continues at least until a part of the sample has already reached the array of electrodes. In embodiments, the feeding may be continued at least until a part of the sample has already reached the plurality of sample outlets.

The method is for the separation of sample components.

The sample comprises components. The components are typically a liquid medium and a plurality of further components. The further components can be referred to as analytes. The method is typically for the separation of analytes. The analytes are typically bioparticles. Bioparticles are particles of biological origin. Examples of bioparticles are viruses, bacteria, cells, extracellular vesicles, and biomolecules. Examples of biomolecules are proteins, and nucleic acids. Examples of nucleic acids are DNA and RNA. The sample may comprise different types of bioparticles, for instance proteins and nucleic acids.

In embodiments, the components may comprise bioparticles. In embodiments, the method may be for continuously separating bioparticles, such as nucleic acids.

Typically, a sample comprising a mixture of components will be fed in the device and the device will output a plurality of fractions. Typically, the proportion of the various components will be different in each fraction. Typically, the proportion of the various analytes will be different in each fraction. Typically, each fraction will be enriched in at least one (but not all) and possibly in only one of the analytes.

In an embodiment, the sample may comprise a plurality of different nucleic acids (e.g., DNA double strands or single strands) and the method is for separating this plurality of different nucleic acids into fractions, wherein, for each fraction, the proportion of at least one (but not all) and possibly of only one of the plurality of different nucleic acids, with respect to the other nucleic acids present in the sample, is larger than in the sample. In embodiments, the different nucleic acids may comprise nucleic acids differing in length by 5 base pairs or less. In embodiments, the method of the present disclosure is suitable for separating nucleic acids differing in length by 1 base pair or more. In embodiments, the method of the present disclosure is suitable for separating nucleic acids differing in length by 1 to 5 base pairs. For instance, the device of the present disclosure is suitable for separating a first nucleic acid having a first length (e.g. 10 to 500 base pairs), from a second nucleic acid comprising the same base pair sequence as the first nucleic acid but being longer than the first nucleic acid by 1 to 5 base pairs.

The sample can be of any origin. For instance, it can be a natural sample, a sample stemming from the manipulation of a natural sample, or a sample of synthetic origin.

The device comprises a channel. The channel is a conduit comprising or being a hollow object suitable for conducting liquids from an inlet to the plurality of outlets of the hollow object.

In embodiments, the bottom of the channel may comprise the array of electrodes on a substrate, the top of the channel may comprise a cover, and the bottom of the channel may be linked to the top of the channel by sidewalls, thereby closing the channel laterally.

Typically, the substrate may comprise a base substrate, an optional isolation layer on the base substrate, and electrical connections over the base substrate (e.g. on the base substrate if no isolation layer is present or on the isolation layer otherwise).

The base substrate may be a dielectric substrate or a semiconductor substrate. When the base substrate is a dielectric substrate (e.g. a glass substrate), the electrical connections (e.g. conductive lines) may be on the base substrate. When the base substrate is a semiconductor substrate, the isolation layer is typically present between the semiconductor substrate and the electrical connections (e.g. conductive lines) in order to minimize parasitic coupling of the AC signal to the substrate.

In embodiments, the substrate may comprise a passivation layer in physical contact with the bottom of each electrode of the array. This passivation layer is optional. The passivation layer is typically a dielectric layer. The dielectric layer may, for instance, be an oxide layer such as a silicon oxide layer. The passivation layer may, for instance, have a thickness of 0.05 to 4 µm, for instance 0.5 to 4 µm or 1 to 2 µm.

The substrate further comprises electrical connections (e.g. conductive lines) for connecting each electrode of the array to the AC power source. This electrical connection can be a resistive connection (when no passivation layer is present between the electrical connections and the electrodes) or a capacitive connection (when the passivation layer is present between the electrical connections and the electrodes).

The channel comprises a sample inlet and a plurality of sample outlets.

In embodiments, more than one inlet may be present. For instance, an inlet may be for the sample and another inlet may be for a buffer liquid.

At least two outlets are typically present. The number of sample outlets may be 2 to 10, for instance 2 to 7 or 2 to 5.

The length of the channel may, for instance, be 1 to 100 mm, or 5 to 80 mm.

A main portion of the channel may be uniform in a cross-sectional area and this area may be 0.05 to 0.60 mm$^2$ when measured at a position along the channel where no electrodes of the array are present.

The channel is suitable for being coupled to a flow generator for translocating the sample components along the channel in a first direction from the sample inlet to the plurality of sample outlets. Such a coupling can be achieved by coupling a flow generator to the sample inlet or to the plurality of sample outlets. However, it is more convenient to couple the flow generator to the sample inlet. The device comprises the flow generator, which is typically a pump but could be any other means (e.g. a syringe) for generating a flow of sample in the channel. The first direction is typically a straight direction. The first direction is typically parallel to the longitudinal extent of the channel.

The device comprises an actuator for translocating the sample components in a second direction, at a first angle with the first direction. This first angle is different from zero.

In absence of operation of the actuator and of the AC power source, the components from the sample would remain undeflected in the second direction.

The actuator may for instance comprise a pair of electrodes for connection to a DC power source, an acoustic wave generator (e.g. surface acoustic wave electrodes connected to an AC power source), or of a combination thereof.

In embodiments, the actuator may comprise a pair of electrodes and a DC power source to which they are connected.

In embodiments, the present disclosure may relate to a method for continuously separating components from a sample, comprising the acts of: providing a field-flow fractionation device comprising: a channel comprising a sample inlet and a plurality of sample outlets, the channel being coupled to a flow generator for translocating the sample components along the channel in a first direction from the sample inlet to the plurality of sample outlets, a pair of electrodes electrically connected to a DC source and disposed in such a way as to enable the generation across the channel of an electric field in a second direction, at an angle with the first direction, an array of electrodes electrically or capacitively connected to an AC source, being in a path taken by the sample components in the channel, arranged in a plurality of rows and in such a way that adjacent rows can be set at different (AC) potentials and every other row can be set at the same (AC) potential, operating the DC source so as to generate the DC electric field across the channel in the second direction, at an angle with the first direction, operating the AC source so as to: set adjacent rows to a different (AC) potential, set every other row to a same potential, and generate an AC electric field between adjacent rows, operating the flow generator in such a way as to feed the sample to the sample inlet and cause the translocation of the sample components along the channel in the first direction from the sample inlet to the plurality of sample outlets, wherein the feeding continues at least until a part of the sample has already reached the array of electrodes, collecting sample components from the sample outlets.

The electrodes of the pair are distinct from the electrodes of the array. The electrodes of the pair are generally not electrically connected to the electrodes of the array when the channel is empty, i.e. when it is free of electrolyte (e.g. sample). The only electrical connection existing between the electrodes of the pair and the electrodes of the array is typically via the presence of the sample in the channel, which typically is an electrolyte. The electrodes of the pair are positioned in such a way as to enable the generation across the channel of an electric field in a second direction, at a (non-zero) first angle with the first direction. The electrodes of the pair are possibly separated by a distance at least equal to the extent of the array of electrodes in the second direction.

In embodiments, the electrodes of the pair may face each other. They may be aligned in a direction perpendicular to the first direction. In other words, a normal to a main surface of both electrodes may be at the non-zero first angle with the first direction.

In embodiments, each electrode of the pair may be in a distinct trench in the cover. The trenches in the cover run along at least a portion of the length of the channel. In embodiments, this portion of the length may represent at least 50%, or at least 75% of the length of the channel. In embodiments, this portion of the length along which the trenches run may overlap with the entirety of the portion of the channel comprising the array.

In other embodiments, the trenches may only partly overlap with each other, thereby allowing the generation of a DC field at a first angle different from 90° from the first direction. It is also possible to have no overlap between the trenches. For instance, the first trench may be positioned upstream of the array and the second trench may be positioned downstream of the array.

The trenches in the cover may be separated from the channel by a permeable membrane. The permeable membrane typically allows electrical current flow between the sample in the channel and an electrolyte in each of the trenches. The permeable membrane typically does not allow gas to permeate across the membrane between the channel and each of the trenches. An example of a suitable membrane is Nafion™.

In embodiments, the two electrodes of the pair may together be formed of a pair of conductive elements running along at least a portion of the length of the channel. In embodiments, this portion of the length may represent at least 50%, or at least 75% of the length of the channel. In embodiments, this portion of the length along which the conductive elements run may overlap with the entirety of the portion of the channel comprising the array.

In other embodiments, the electrodes of the pair may only partly overlap with each other, thereby allowing the generation of a DC field at a first angle different from 90° from the first direction. It is also possible to have no overlap between the electrodes of the pair. For instance, the first electrode may be positioned upstream of the array and the second electrode may be positioned downstream of the array.

The pair of electrodes is electrically connected to a DC power source. The device comprises the DC power source. In the presence of the DC power source (e.g. when the DC power source is operated), the voltage across the two electrodes may be 5 to 100 V, 5 to 30 V, or 8 to 16V.

Figure 10:
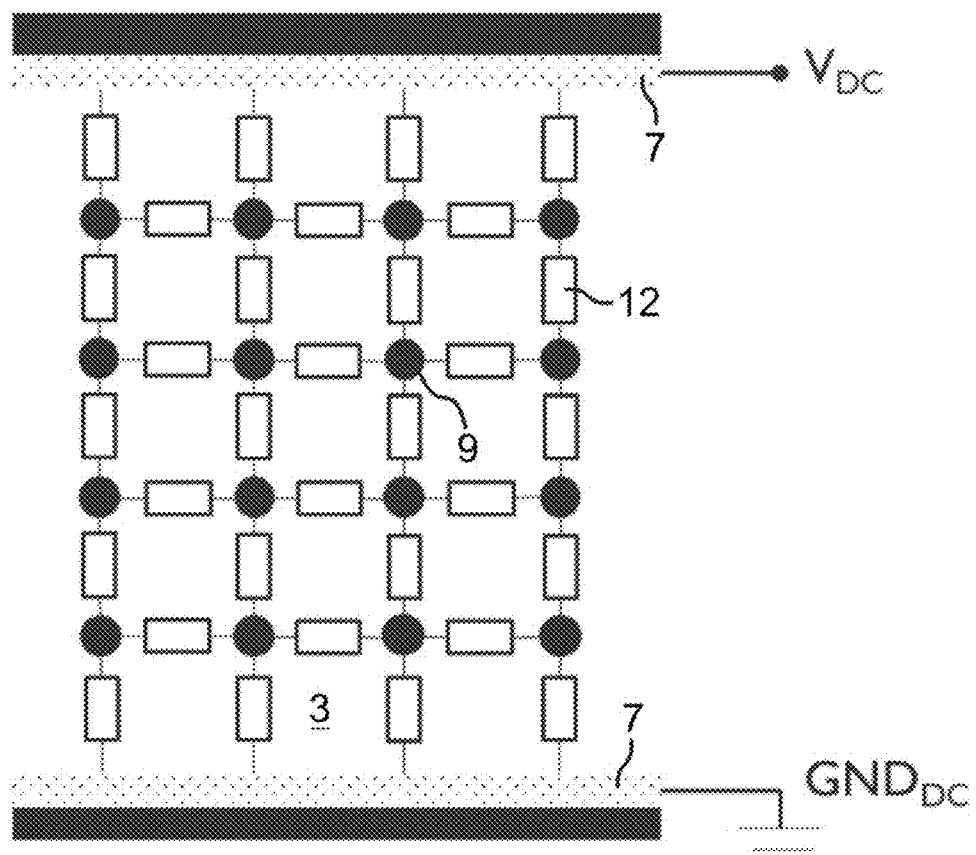
FIG. 10 is a schematic representation of an equivalent circuit corresponding to an array of electrodes in a liquid, in the presence of only the DC voltage across the channel, according to an example embodiment.
Figure 11:
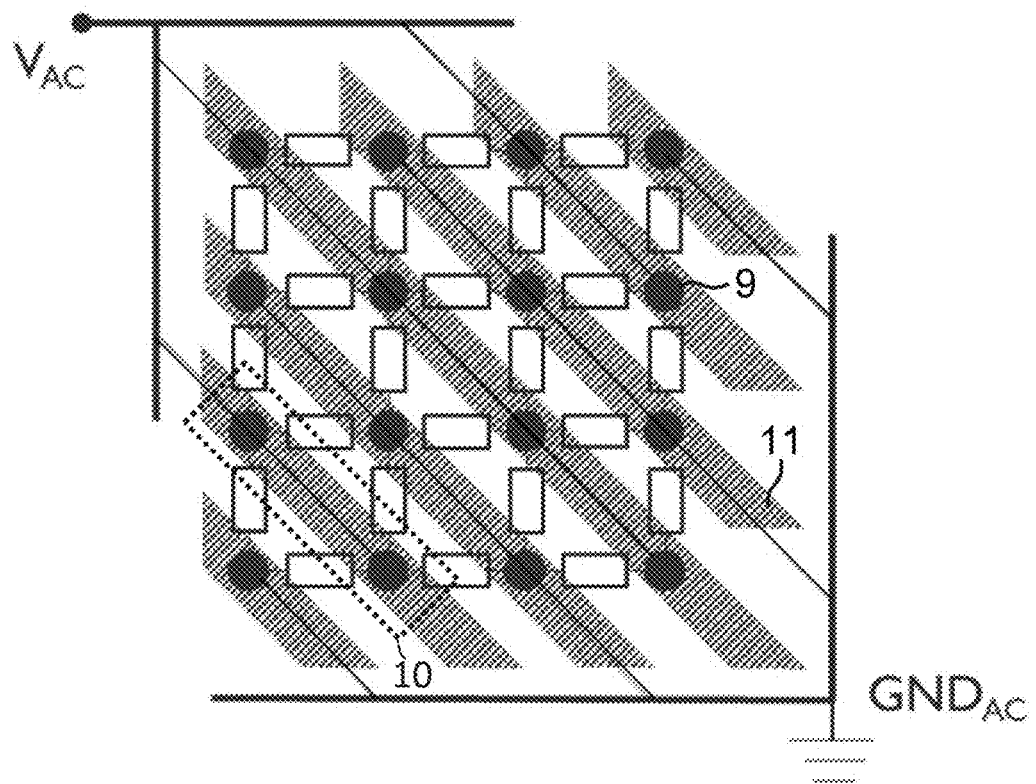
FIG. 11 is a schematic representation of an equivalent circuit corresponding to an array of electrodes in a liquid, in the presence of only the AC voltage between two sets of electrodes within the array, according to an example embodiment.

When the device is connected to the DC power source, gas bubbles can be created on one or both electrodes. However, the bubbles are typically blocked by the membrane therefore not affecting the sample flow in the channel. We now refer to FIGS. 10, 11, and 13 which illustrate an embodiment where the actuator comprises a pair of electrodes different from the electrodes of the array. When the device (1) is connected to the DC power source ($V_{DC}$), a DC electric field forms in the sample, which can be represented as a resistor (12) network (see FIG. 10), and each electrode (9) of the array picks up the DC potential of the liquid in its vicinity. Meanwhile, two different AC voltages ($V_{AC}$), e.g. 10 V for electrodes on every other row (10) (electrodes of a first set) and 0 V for electrodes on the remaining rows (10) (electrodes of a second set), can be applied to the array (see FIG. 11).

In embodiments, the AC voltage difference between the electrodes (9) on every other row (10) (i.e. the electrodes (9) of the first set) and the remaining electrodes (9) (i.e. the electrodes (9) of the second set) is 1 to 100 V, for instance 1 to 25 V (e.g. 4 to 25 V), or 1 to 12 V (e.g. 8 to 12 V). In other words, in embodiments, the different AC potentials may differ by 1 to 100 V, 1 to 25 V, or 1 to 12 V. For instance, the different AC potentials may differ by 4 to 25 V. The selection of the difference in AC potential may be influenced by the gap between the electrodes. For a larger gap, a larger AC potential difference is generally present, and vice versa. For instance, for a gap of 25 to 50 µm, an AC potential difference of 50 to 100 V is present; and for a gap of 1 to 24 µm, an AC potential difference of 1 to 12 V is present.

Figure 12:
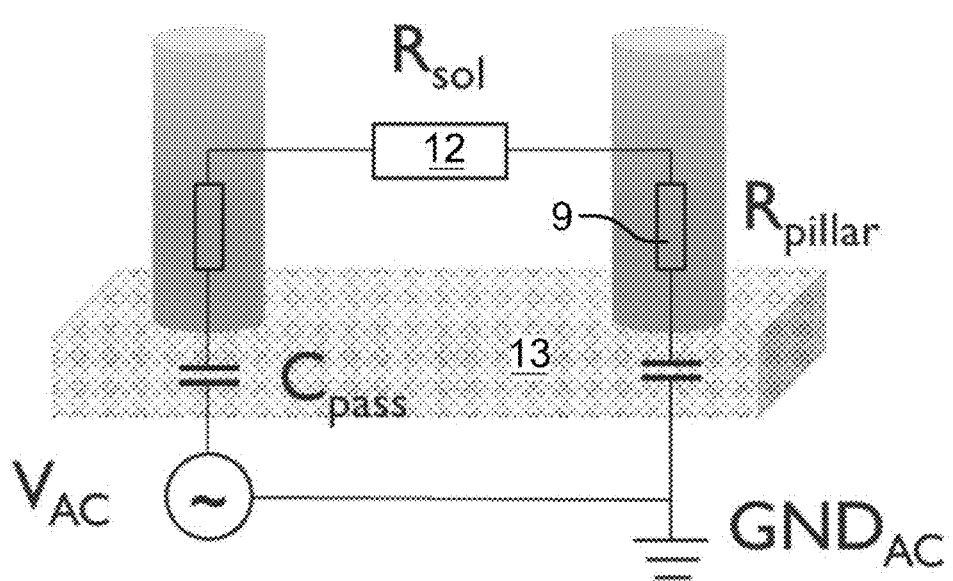
FIG. 12 is a schematic representation of an equivalent circuit corresponding to two electrodes within an array, each electrode belonging to a different set within the array, in a liquid, in the presence of only the AC voltage between the two electrodes, wherein the electrodes are capacitively connected to the AC power source, according to an example embodiment.

FIG. 12 is a schematic representation of an equivalent circuit corresponding to an embodiment where, in order to decouple the AC potential ($V_{AC}$) from the DC potential ($V_{DC}$), a capacitor ($C_{pass}$) (typically a passivation layer (13)) is added between the AC voltage source and each set of electrodes (9). The capacitance value is typically sufficiently large so that the resultant impedance is smaller than the resistance of each electrode (9) and also smaller than the each between electrodes (9) of different sets. Due to the presence of a capacitor ($C_{pass}$) for each electrode (9) of the array, each electrode (9) within a set of the array will have the same AC potential ($V_{AC}$) but possibly different DC potential ($V_{DC}$), and the DC and AC voltages can be tuned independently. Also depicted in FIG. 12 is the resistance (12) associated with the presence of the liquid sample.

The methods according to embodiments of the present disclosure wherein the actuator comprises a pair of electrodes and a DC power source to which they are connected are particularly well suited to the separation of nucleic acids. Indeed, the methods according to such embodiments of the present disclosure are most effective to separate polarizable elements and nucleic acids are particularly polarizable.

In embodiments where the substrate comprises a passivation layer in physical contact with the bottom of each electrode of the array, and wherein the actuator comprises a pair of electrodes and a DC power source to which they are connected, a decoupling can be achieved between the AC potential applied to the electrodes of the array and the DC potential imposed by the presence of a pair of electrodes as the actuator and experienced at the position of each electrode of the array.

Figure 16:
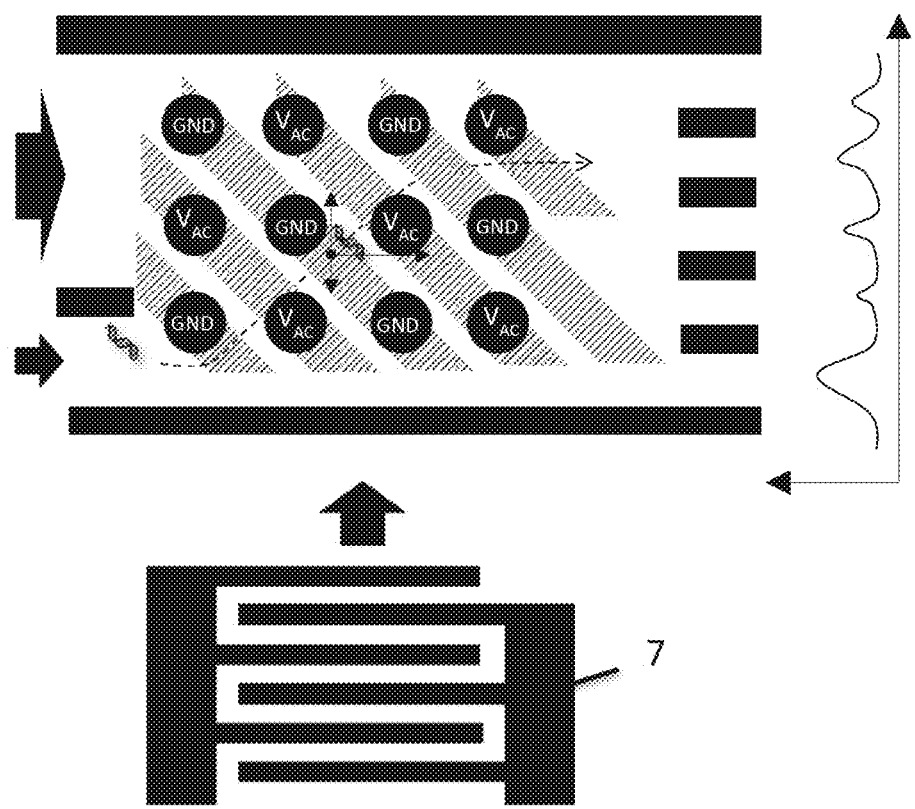
FIG. 16 is a schematic representation of a top view of a device wherein the actuator comprises an acoustic wave generator, according to an example embodiment.
Figure 17:
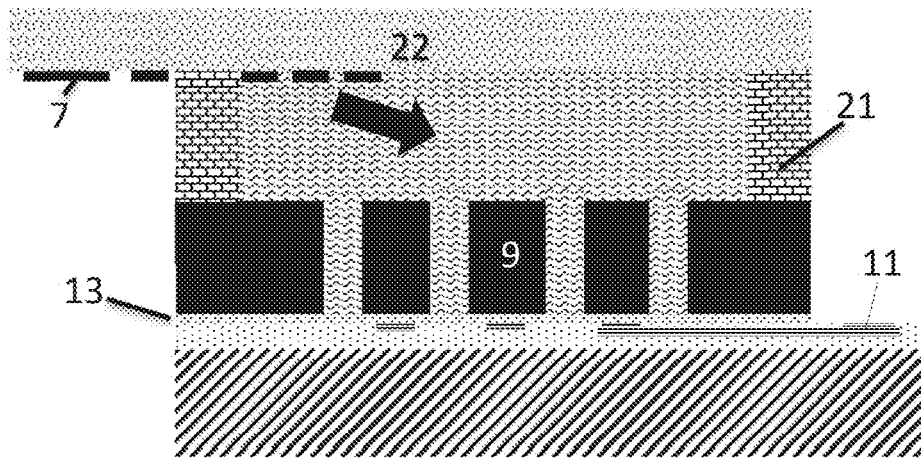
FIG. 17 is a schematic representation of a vertical cross-section through a device, according to an example embodiment.

We now refer to FIGS. 16 and 17. FIGS. 16 and 17 are analogous to FIGS. 7 (see infra) and 13 respectively except for the fact that the pair of electrodes is not present and that the actuator (7) takes the form of an acoustic wave generator, here a pair of surface acoustic wave electrodes, connected to an AC power source. In embodiments, the acoustic wave generator (7), e.g. the surface acoustic wave electrodes (7) may be attached to the cover (22) of the channel in such a way as to be in the channel.

The second direction corresponds to the direction of the flow of components when the flow generator is not actuated and only the actuator is actuated.

The second direction may be at a first angle of 30 to 90° with the first direction and is possibly perpendicular to the first direction.

Typically, generating the AC electric field between adjacent rows causes adjacent rows to receive a different contribution to their electrical potential from the AC power source and that every other row receives a same contribution to their electrical potential from the AC power source.

In embodiments, the electrodes of the array may be arranged in a plurality of rows and may be electrically connected by electrical connections to the AC power source in such a way that adjacent rows can be set at different AC potentials and every other row can be set at the same potential. In other words, in embodiments, the array of electrodes (9) may comprise two sets of electrodes, each set forming a plurality of rows, the rows of the first set alternating with the rows of the second set in the array. In embodiments, the AC voltage difference between the electrodes (9) on every other rows (10) (i.e. the electrodes (9) of the first set) and the remaining electrodes (9) (i.e. the electrodes (9) of the second set) may be 1 to 100V, 1 to 25V, or 1 to 12V. For instance, the different AC potentials may differ by 4 to 25V.

In embodiments, the array may comprise at least four rows, each row comprising at least two electrodes.

Figure 7:
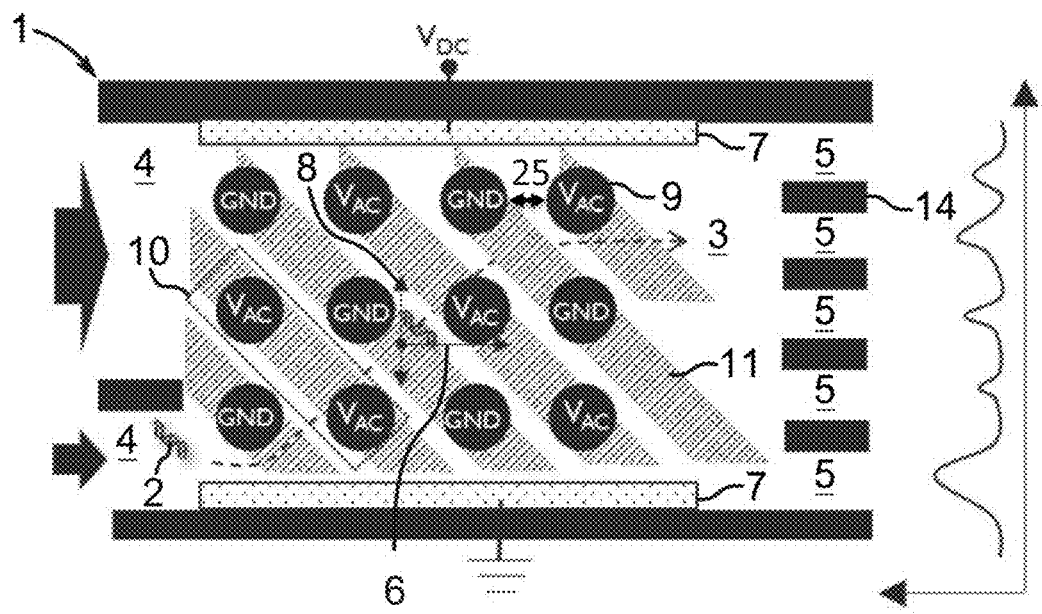
FIG. 7 is a top view of a device, according to an example embodiment.

The rows of the array are generally arranged so that they are neither parallel to the first direction, nor to the second direction. The rows are generally oblique with respect to both the first direction and the second direction. For instance, the rows (10) may be at a third angle of 40 to 50° with the first direction (6). This situation is depicted in FIG. 7. In embodiments, when the rows are arranged so that they are neither parallel to the first direction, nor to the second direction, the length of each row may be adapted so that the electrodes of the array form a rectangle. Generally, the rectangle has two sides parallel to the first direction and two sides perpendicular thereto.

Figure 18:
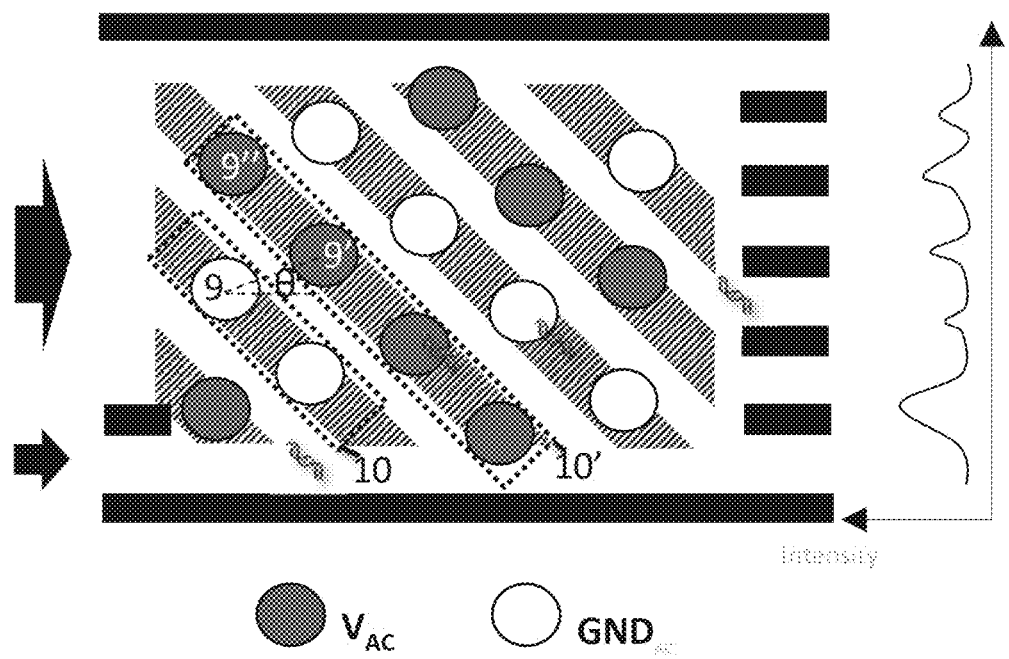
FIG. 18 is a top view of a device wherein the adjacent rows of the array of electrodes are arranged so that adjacent electrodes belonging to adjacent rows are aligned in a direction forming a second angle with the first direction, according to an example embodiment.

We now refer to FIG. 18. In embodiments, adjacent rows of the array may be arranged so that adjacent electrodes (9, 9') belonging to adjacent rows (10, 10') are aligned in a direction forming a second angle (θ) of for instance 1° to 40°, or 5° to 30°, with the first direction. This allows the components of the sample to periodically experience a dielectrophoretic force in the second direction during their flow in the first direction. This, in turn, allows already some separation of the components of the sample in a direction at a first angle with the first direction, even in the absence of an actuator. It is noteworthy that a first electrode (9) has a plurality of second electrodes (9', 9") that could be considered adjacent thereto but it is sufficient if one of the second electrodes (9', 9") is aligned with the first electrode (9) in a direction forming a second angle (θ) of 1° to 40°, or 5° to 30° with the first direction for the above alignment condition to be fulfilled.

The electrodes of the array may comprise or be made of any conductive material. For instance, they can comprise or be made of metal or of a doped semiconductor. Typically, the electrodes of the array are made of doped silicon. This can be advantageous because doped silicon can have a conductivity intermediate between the conductivity of typical liquid media composing the samples and the conductivity of the electrical connections for connecting each electrode to the AC power source. This can be advantageous because it helps maximize the power delivered to the liquid instead of having that power lost in the electrical connections or in the doped-silicon pillars. Furthermore, the fabrication of doped silicon electrodes is compatible with standard semiconductor processing practices.

The array of electrodes comprises connections resistively connecting the electrodes of the array and electrically (resistively or capacitively) connecting them to an AC power source, in such a way that adjacent rows can be set at different AC potentials and every other row can be set at the same AC potential. A capacitive connection to the AC power source is possible.

In embodiments where the actuator is a pair of electrodes connected to a DC power source, the capacitive connection permits the AC potential set at the level of the electrodes of the array to be independent of the DC potential set at the level of the pair of electrodes for generating an electric field in the second direction. A capacitive connection can be obtained by having a dielectric layer between the array of electrodes and (the connections to) the AC power source.

In embodiments, the electrodes of the array may be connected by electrical connections allowing the setting of each electrode to a potential independently. The array of electrodes comprises electrical connections connecting the electrodes of the array and connecting the array to an AC power source, in such a way that each electrode can be set to an AC potential (e.g. a different AC potential) independently. In other words, in embodiments, the electrodes of the array may be independently addressable. In embodiments, the AC power source may operate at a frequency of 10 kHz to 10 GHz, or 100 kHz to 100 MHz.

In embodiments, the device may comprise two sets of conductive interdigitated fingers electrically connected to an AC power source in such a way that each set can be set at a different AC potential, and wherein each finger within a set has one of the plurality of rows of electrodes either on it and electrically (resistively) connected to it or over it, separated from it by a passivation layer, and capacitively connected to it. This setup has the potential advantage of being more economical than a set up wherein each electrode can be set to a potential independently. In other words, in embodiments, the electrical connections may comprise two sets of conductive interdigitated fingers, wherein each finger within a set has one of the plurality of rows of electrodes on it and electrically connected to it, and wherein the AC generator is electrically connected to the array of electrodes via the two sets of conductive interdigitated fingers in such a way that each set can be set at a different AC potential. Yet in other words, the field-flow fractionation device may further comprise two sets of conductive interdigitated fingers, wherein each finger within a set has one of the plurality of rows of electrodes on it and electrically connected to it, and wherein the AC generator is electrically connected to the array of electrodes via the two sets of conductive interdigitated fingers in such a way that each set can be set at a different AC potential.

In order to make the two sets of conductive interdigitated fingers suitable for being electrically connected to an AC power source, each set can for instance be electrically connected to a connection pad, itself electrically (resistively or capacitively) connectable to the AC power source.

Embodiments wherein the device comprises the two sets of conductive interdigitated fingers, each being connected to a connection pad, represent examples of electrical connections connecting the electrodes of the array and allowing electrical (resistive or capacitive) connection to an AC power source, in such a way that adjacent rows can be set at different AC potentials and every other row can be set at the same AC potential.

In embodiments, the array of electrodes may further comprise, in addition to the connections allowing electrical (resistive or capacitive) connection to an AC power source, connections allowing electrical connection to a DC power source in such a way that adjacent rows can be set at different DC potentials and every other row can be set at the same DC potential. In other words, the electrodes of the array may be, but do not have to be, connected to a DC power source in such a way that adjacent rows can be set at different DC potentials and every other row can be set at the same DC potential. In the most typical case, the electrodes of the array do not further comprise the connections allowing electrical connection to a DC power source.

In embodiments, the electrodes of the array may be pillars. In embodiments, the electrodes of the array may have a height, a width, and a depth, wherein the height is measured perpendicularly to the substrate on which the electrodes are present, wherein the width and the depth are two dimensions, orthogonal to each other and to the height, wherein the width is smaller or equal to the depth. In embodiments, the width may be equal to the depth.

In embodiments, the electrodes of the array may have a height of 5 to 200 μm, or 50 to 200 μm. This is typically determined by the required sample throughput and fabrication feasibility. Higher electrodes generally allow more throughput at the same flow rate. But higher electrodes, or electrodes of high aspect ratio, are more difficult to fabricate. The electrodes typically have similar height as the channel. For instance, the electrodes may have a height of 80 to 100% of the channel height, such as 90% of the channel height, but generally the same as the channel height. The channel height equals the distance between the channel bottom and the channel top. In embodiments where the electrodes of the array do not have a height equal to 100% of the channel height, a non-conductive structure, of lateral dimensions within 10% of the lateral dimensions of the electrodes, may be added on top of each electrode in order to improve the throughput. The height of these non-conductive structures may be such that the combination electrode-non-conductive structure has a height of 80 to 100% of the channel height, such as 90% of the channel height, but typically the same as the channel height.

In embodiments, the electrodes of the array may have a width of 1 to 50 μm, or 5 to 20 μm. The width is dependent on the desirable electrical resistance of the electrodes of the array (such as pillar resistance) and the throughput requirement. Wider electrodes (e.g. wider pillars) allow higher electrodes, thus higher throughput.

In embodiments, the electrodes of the array may have a depth of 1 to 50 μm, or 5 to 20 μm. The depth is dependent on the desirable electrical resistance of the electrodes of the array (such as pillar resistance) and the throughput requirement. Deeper electrodes (e.g. deeper pillars) typically allow higher electrodes, thus higher throughput.

In embodiments, the width is within 20% of the depth, within 10% of the depth, or is the same as the depth. In embodiments, the electrodes of the array may have a height to width ratio of 5 to 20.

In embodiments, the electrodes within the array may be at a pitch of 5 to 30 μm, or 10 to 20 μm. This can be advantageous because it is small enough to allow a relatively high electrode density, which allows a high field gradient between electrodes set at different AC potentials, while simultaneously being large enough not to interfere significantly with the sample flow in the first direction along the channel.

In embodiments, adjacent electrodes belonging to adjacent rows within the array may be separated by a gap of 1 to 50 μm, or 5 to 20 μm.

In embodiments, the device further comprises the AC power source, for instance connected to the array via the two sets of conductive interdigitated fingers.

In embodiments, the electrodes within the array may have a resistance less than the resistance of the sample but larger than the resistance of the electrical connections.

In embodiments, the electrodes within the array may have a resistivity less than $2\times10^5$ ohm-m, less than $2\times10^1$ ohm-m, or less than $2\times10^{-1}$ ohm-m but larger than the resistivity of the conductive material used in the electrical connections for connecting each electrode to the AC power source.

In embodiments, the electrodes within the array may have a resistivity less than $2\times10^5$ ohm-m, less than $2\times10^1$ ohm-m, or less than $2\times10^{-1}$ ohm-m but larger than the resistivity of the conductive interdigitated fingers.

It can be advantageous to have the conductance of the electrodes of the array in between the conductance of the sample and the conductance of the electrical connections for connecting each electrode to the AC power source because it allows each electrode of the array to generate a local AC field. Since the sample typically has a resistivity of $2\times10^5$ ohm-m or $3\times10^5$ ohm-m if it is very diluted and has a resistivity close to deionized water and of about $2\times10^1$ ohm-m if it has a resistivity close to a phosphate-buffered saline, it can be advantageous to have the electrodes within the array having a resistivity less than these values, but larger than the resistivity of the electrical connections for connecting each electrode to the AC power source.

In embodiments, the electrodes within the array may have a resistivity of $10^{-5}$ ohm-m to 1 ohm-m (e.g. $10^{-4}$ ohm-m to 1 ohm-m or $10^{-3}$ ohm-m to $2\times10^{-5}$ ohm-m), or $5\times10^{-5}$ to $10^{-3}$ ohm-m.

In embodiments, the cover of the channel may be transparent. For instance, it may be a glass cover.

FIG. 7 shows a schematic representation of a top view of a device suitable for use in a method according to an embodiment. In this figure, a field-flow fractionation device (1) is depicted, for the continuous separation of sample components (2) comprising:
a. a channel (3) comprising a sample inlet (4), a buffer inlet (4), and a plurality of sample outlets (5). The sample outlets (5) are delimited by separation walls (14). The channel (3) is suitable for being coupled to a flow generator for translocating the sample components (2) along the channel (3) in a first direction (6) from the sample inlet (4) to the plurality of sample outlets (5),
b. a pair of electrodes (7) electrically connected to a DC power source ($V_{DC}$) and positioned in such a way as to enable the generation across the channel (3) of an electric field in a second direction (8), perpendicular with the first direction (6),
an array of electrodes (9) resistively or capacitively connected to an AC power source ($V_{AC}$), being
i. in a path taken by the sample components (2) in the channel (3),
ii. arranged in a plurality of rows (10), and
iii. electrically connected by electrical connections (11) to the AC power source in such a way that adjacent rows (10) can be set at different AC potentials and every other row (10) can be set at the same AC potential. The rows (10) of the array are arranged so that they are at a third angle of 40 to 50° with the first direction (6). Also, the length of each row (10) is adapted so that the electrodes (9) of the array form a rectangle with two sides parallel to the first direction (6) and two other sides, parallel to the second direction (8). The dotted arrow shows a path taken by one of the components (2) of the sample to end up in one of the outlets (5). Adjacent electrodes (9) belonging to adjacent rows (10) within the array are separated by a gap (25). Also depicted in FIG. 7 is a graph showing various sample fractions separated in the second direction (8) wherein the amplitude of the graph is proportional to the concentration of that fraction.

In embodiments, the actuator and the AC power source may be coupled to a controller programmed to allow for the simultaneous operation of the actuator and the AC power source.

Figure 9:
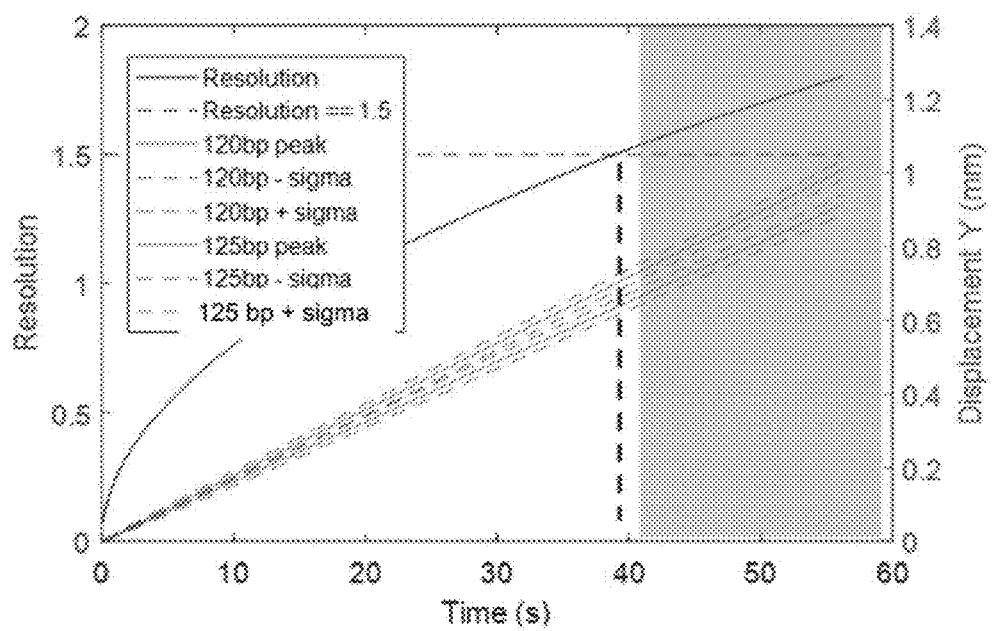
FIG. 9 is a graph of the resolution over time predicted by modelling of a device for separating a 120 bp double-strand DNA from a 125 bp double-strand DNA, according to an example embodiment.

FIG. 9 is a graph of the resolution over time predicted by modelling of a method for separating a 120 bp double-strand DNA from a 125 bp double-strand DNA. This modelling considers a DC voltage of 12 V between the pair of electrodes, an AC voltage of 10 V between the two sets of the array, a channel having a length of 20 mm, a width of 1 mm, and a height of 0.15 mm. The inter-pillar distance is 4 µm. As can be seen on the graph, the displacement time for an analyte is 39 s for a resolution of 1.5 to be obtained. The peak broadening was evaluated at 43 µm. The flow rate was 0.16 µl/min. The total processing time was 23 min. The upper solid curve shows how the resolution improves with the displacement time. The middle solid curve shows the displacement over time for a 125 bp DNA double-strand. The dashed curves directly above and below the middle solid curve show the displacement over time at +1 standard deviation and −1 standard deviation. The lower solid curve shows the displacement over time for a 120 bp DNA double-strand. The dashed curves directly above and below the lower solid curve show the displacement over time at +1 standard deviation and −1 standard deviation.

The manufacture of a field-flow fractionation device as used in methods according to embodiments of the first aspect may comprise the steps of:
 providing a channel comprising a sample inlet and a plurality of sample outlets, the channel being suitable for being coupled to a flow generator for translocating the sample components along the channel in a first direction from the sample inlet to the plurality of sample outlets,
 providing an actuator, distinct from the flow generator, for translocating the sample components in a second direction, at a first angle with the first direction, for instance by providing a pair of electrodes, for electrical connection to a DC power source, positioned in such a way as to enable the generation across the channel of an electric field in a second direction, at an angle with the first direction,
 Providing an array of electrodes for electrical or capacitive connection to an AC power source, distinct from the flow generator and the actuator, being in a path taken by the sample components in the channel, arranged in a plurality of rows and electrically connected by electrical connections in such a way that adjacent rows can be set at different AC potentials and every other row can be set at the same AC potential.

Figure 13:
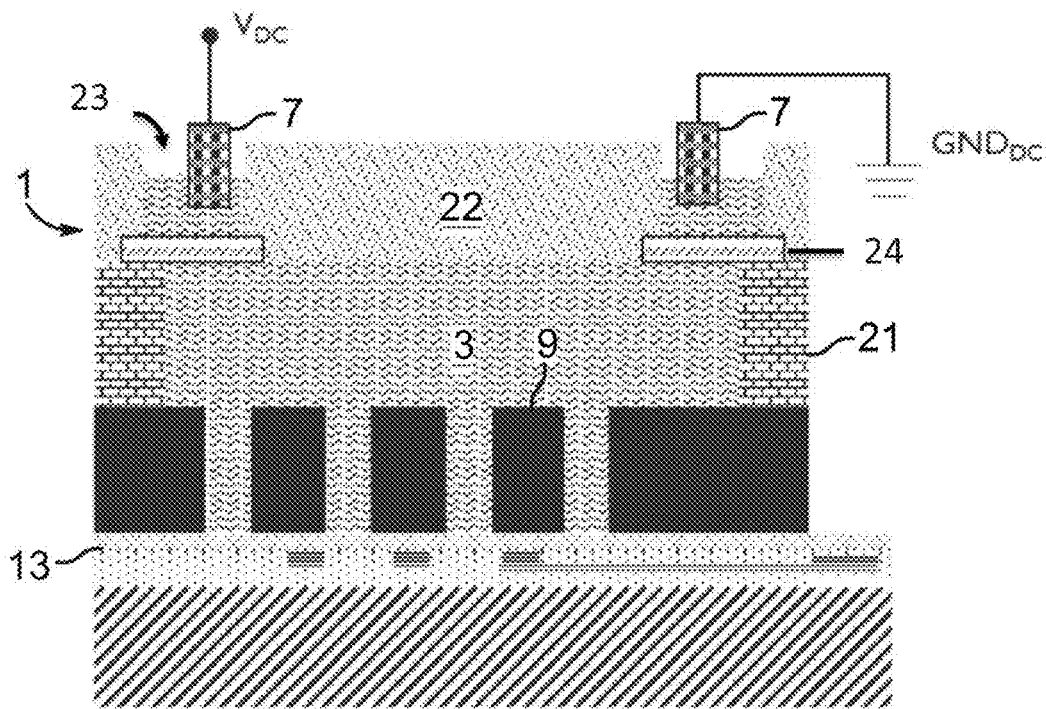
FIG. 13 is a vertical cross-section of a device, according to an example embodiment.
Figure 14:
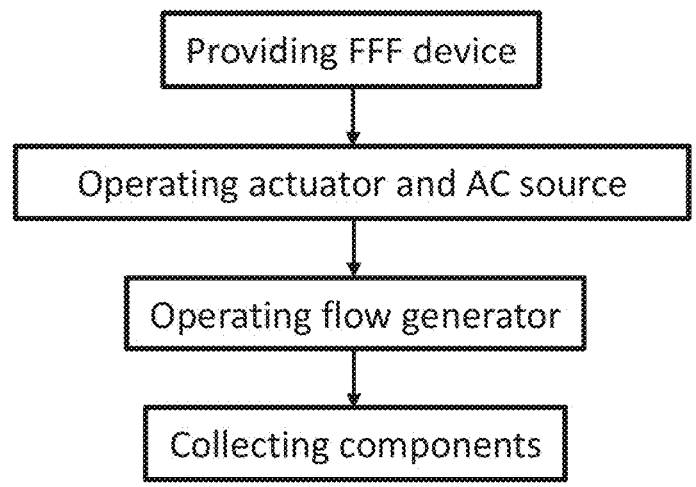
FIG. 14 is a flowchart showing a method, according to an example embodiment.
Figure 15:
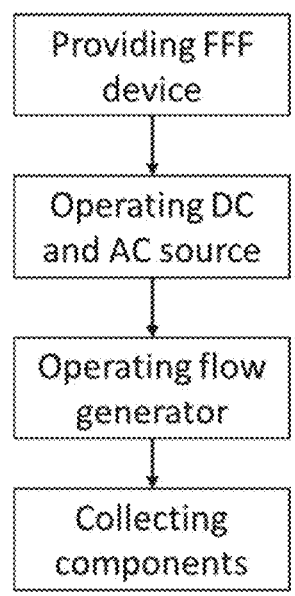
FIG. 15 is a flowchart showing a method, according to an example embodiment.

FIG. 13 shows an illustrative embodiment of a device (1) that can be used in a method according to embodiments of the present disclosure. To fabricate the device (1) of FIG. 13, of providing the array of electrodes (9) can for instance be performed as follows. Referring to FIG. 1, a doped semiconductor substrate (15) (e.g. doped silicon (15)) is provided and a dielectric layer (16) (e.g. an oxide layer (16)) is formed thereon. An array of contact positions is then defined in the dielectric layer by etching the dielectric layer so as to form openings exposing the doped semiconductor substrate (15). The array of contact positions can be arranged as correspondingly described in any embodiment for the array of electrodes. These contact positions are arranged in a plurality of rows (10). For instance, the array of contact positions may comprise at least four rows (10) which each comprise at least two contact positions.

The openings are then filled with a conductive material (e.g. aluminium), thereby forming an array of bond pads (17) corresponding to the array of contact positions, until it overflows and a homogeneous layer of conductive material is formed. Parts of this layer is then etched to leave connecting lines (18) electrically connecting together bond pads (17) belonging to every other row (10) of the array, on one hand, and electrically connecting together bond pads (17) belonging to the remaining rows (10) of the array, on the other hand. For instance, these connecting lines (18) can form two sets of conductive interdigitated fingers (11), wherein each finger (11) within a set has one of the plurality of rows (10) of bond pads (17) on it and is electrically (resistively or capacitively) connected to it.

Figure 2:
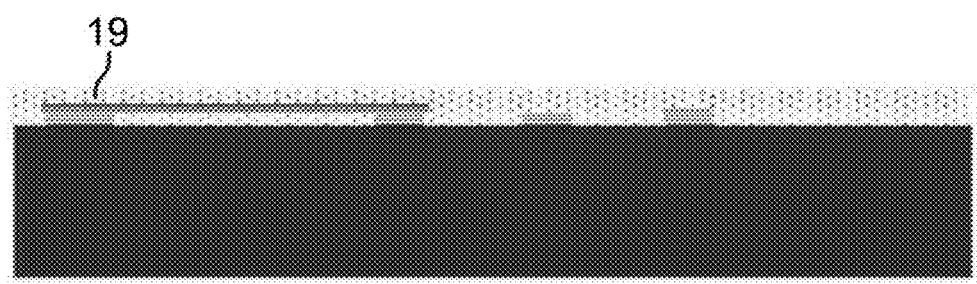
FIG. 2 shows a vertical cross-section of an intermediate structure for the construction of a device, according to an example embodiment.

Referring to FIG. 2, an isolation layer of dielectric material (19) (e.g. an oxide (19) such as silicon oxide (19)) is formed between and over the conductive lines (18) and this layer (19) is then planarized in such a way as to still cover all the conductive lines (18).

Figure 3:
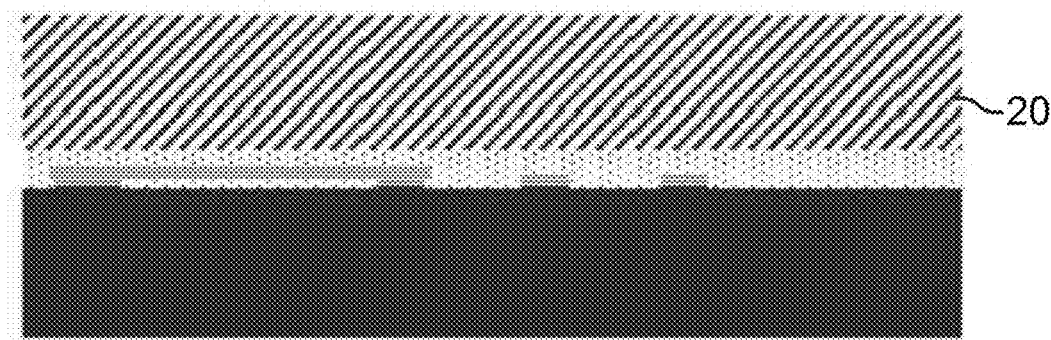
FIG. 3 shows a vertical cross-section of an intermediate structure for the construction of a device, according to an example embodiment.

Referring to FIG. 3, a base substrate (20) (e.g. a silicon wafer (20)) is bonded to the layer of dielectric material. In embodiments, the base substrate (20) is not doped.

Figure 4:
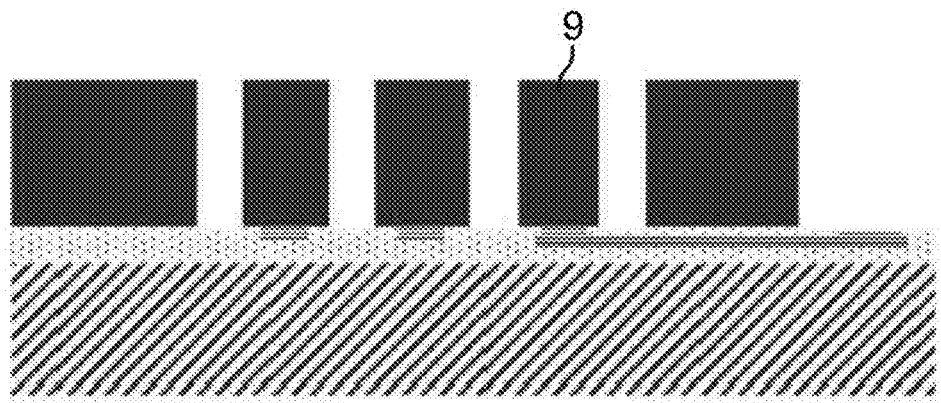
FIG. 4 shows a vertical cross-section of an intermediate structure for the construction of a device, according to an example embodiment.

Referring to FIG. 4, the structure is shown flipped upside down. The doped semiconductor substrate (15) is optionally grinded until its height corresponds to the height wished for the electrodes (9) of the array. The doped semiconductor substrate (15) is then patterned by etching in order to form the array of electrodes (9) overlapping with the array of contact positions, and hence the array of bond pads (17). Each electrode (9) of the array has its base in electrical contact with a bond pad (17).

Figure 8:
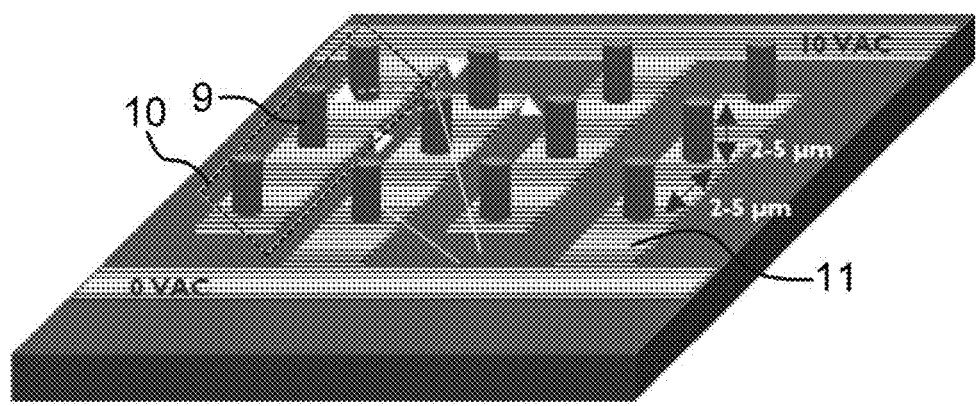
FIG. 8 is a perspective view of an intermediate structure for the construction of a device, according to an example embodiment.

FIG. 8 shows a perspective view corresponding to FIG. 4.

Figure 5:
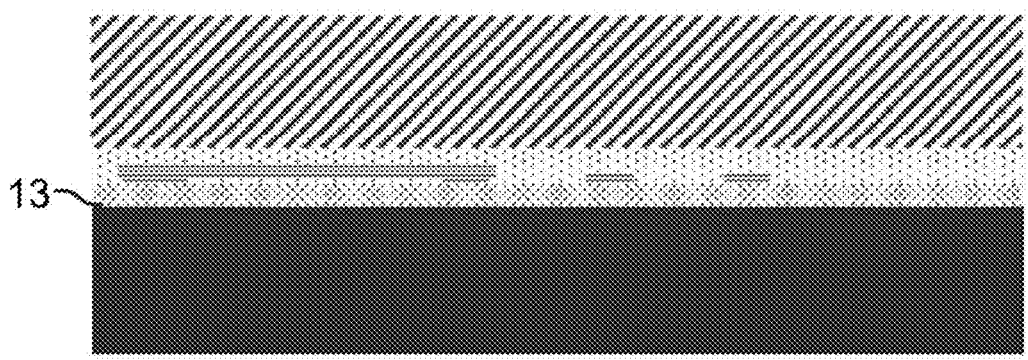
FIG. 5 shows a vertical cross-section of an intermediate structure for the construction of a device, according to an example embodiment.

FIG. 5 shows an alternative to FIG. 3 where a passivation layer (13) (e.g. a dielectric layer (13) such as a SiO$_2$ layer (13)) is formed between the doped semiconductor substrate (15) and the bond pads (17).

In order to form the structure of FIG. 5, a doped semiconductor substrate (15) (e.g. doped silicon (15)) is provided and a passivation layer (13) (e.g. an oxide layer (13)) is formed thereon. An array of contact positions is then defined in the dielectric layer by etching the dielectric layer so as to form openings which do not expose the doped semiconductor substrate (15). In other words, the bottom surfaces of these openings belong to the passivation layer (13). These openings are arranged so as to form an array of a plurality of rows (10). For instance, the array may comprise at least four rows (10) which comprise at least two openings.

The openings are then filled with a conductive material (e.g. aluminium or copper), thereby forming bond pads (17), until it overflows and a homogeneous layer of conductive material is formed. Parts of this layer are then etched to leave connecting lines (18) electrically connecting together bond pads (17) belonging to every other row (10) of the array, on one hand, and electrically connecting together openings belonging to the remaining rows (10) of the array, on the other hand. For instance, these connecting lines can form two sets of conductive interdigitated fingers (11), wherein each finger (11) within a set has one of the plurality of rows (10) of bond pads (17) on it and is electrically (resistively or capacitively) connected to it.

A layer of dielectric material (19) (e.g. an oxide (19) such as silicon oxide (19)) is formed between and over the conductive lines (18) and this layer is then planarized in such a way as to still cover all the conductive lines (18).

A base substrate (20) (e.g. a silicon wafer (20)) is bonded to the layer of dielectric material (19). The resulting structure is depicted in FIG. 5.

Figure 6:
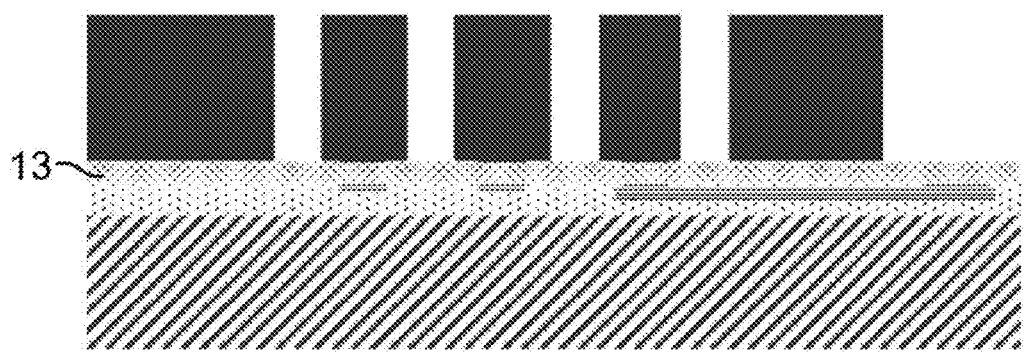
FIG. 6 shows a vertical cross-section of an intermediate structure for the construction of a device, according to an example embodiment.

Referring to FIG. 6, the structure is shown flipped upside down. The doped semiconductor substrate (15) is optionally grinded until its height corresponds to the height wished for the electrodes (9) of the array. The doped semiconductor substrate (15) is then patterned by etching in order to form the array of electrodes (9) overlapping with the array of contact positions, and hence the array of bond pads (17). Each electrode (9) of the array has its base in capacitive contact with a bond pad (17).

Referring to FIG. 13, providing a channel (3) can comprise a step of forming sidewalls (21) on top of the structure obtained in FIG. 3 or 5, forming one or more separation walls (14) (see FIG. 7) for defining the plurality of outlets (5) downstream of the array of electrodes (9), the separation walls (14) having the top of the separation walls (14) being coplanar with the top of the sidewalls (21), and then bonding a cover (22) (e.g. a glass cover (22)) on top of the sidewalls (21) and the separation walls (14), thereby forming a channel (3) comprising a sample inlet (4) and a plurality of sample outlets (5).

In embodiments, before bonding a cover (22) on top of the sidewalls (21) and the separation walls (14), one or more further separation walls (14) may be formed for defining a plurality of inlets (4) upstream of the array of electrodes (9), wherein the top of the further separation walls (14) are also coplanar with the top of the sidewalls (21).

In an alternative embodiment, instead of forming sidewalls (21) on top of the structure obtained in FIG. 3 or 5, sidewalls (21) may be formed on top of a cover (22) (e.g. a glass cover (22)), forming one or more separation walls (14) on the top of the cover (22) for defining the plurality of outlets (5) downstream of the array of electrodes (9), the top of the separation walls (14) being coplanar with the top of the sidewalls (21), and bonding the top of the structure obtained in FIG. 3 or 5 with the top of the sidewalls (21) and the separation walls (14).

Of course, it is also possible to form the sidewalls (21) on the structure of FIG. 3 or 5 and the separation walls (14) on the cover (22), or vice versa.

Providing the pair of electrodes (7) may comprise a step of forming two trenches (23, FIG. 13) in a cover (22) of the channel (3), the trenches (23) running along at least a portion of the length of the channel (3). In embodiments, this portion of the length may represent at least 50%, or at least 75% of the length of the channel (3). In embodiments, this portion of the length along which the trenches run may overlap with the entirety of the portion of the channel comprising the array.

A permeable membrane (24, FIG. 13) may be formed at the bottom of each trench, thereby separating the trench (23) in the cover (22) from the channel (3). The permeable membrane (24) typically allows electrical contact between liquid in the channel (3) and liquid in each of the trenches (23).

Each electrode (7) of the pair may then be placed in a distinct trench (23) so as to be immersed when a liquid is present in the trenches (23). In embodiments, both electrodes (7) may then be connected to a DC power source ($V_{DC}$).

In a second aspect, the present disclosure relates to a field-flow fractionation device (1) for the continuous separation of sample components (2) comprising:

- a channel (3) comprising a sample inlet (4) and a plurality of sample outlets (5), the channel (3) being suitable for being coupled to a flow generator for translocating the sample components (2) along the channel (3) in a first direction (6) from the sample inlet (4) to the plurality of sample outlets (5),
- an actuator (7), which is not the flow generator, coupled to the channel (3), for translocating the sample components (2) in a second direction (8), at a first angle with the first direction (6),
- an array of electrodes (9), which is not the flow generator, and which is distinct from the actuator (7), being in a path taken by the sample components (2) in the channel (3), arranged in a plurality of rows (10), and comprising electrical connections (11) for electrically connecting the array to an AC power source in such a way that adjacent rows (10) can be set at different AC potentials and every other row (10) can be set at the same AC potential, and
- a controller coupled to the actuator and suitable for being additionally coupled to the AC power source, the controller being programmed to allow for the simultaneous operation of the actuator and the AC power source.

In embodiments, the device may further comprise the power source.

In embodiments, the device may further comprise the flow generator, coupled to the channel (3), for translocating the sample components (2) along the channel (3) in a first direction (6) from the sample inlet (4) to the plurality of sample outlets (5).

In embodiments, the device may further comprise means for performing any one of the steps of the method of the first aspect.

Any feature of the device of the second aspect may be as correspondingly described in the first aspect.

It is to be understood that although embodiments, specific constructions, and configurations, as well as materials, have been discussed herein for devices according to the present disclosure, various changes or modifications in form and detail may be made without departing from the scope of this disclosure. For example, any formulas given above are merely representative of procedures that may be used. Functionality may be added or deleted from the block diagrams and operations may be interchanged among functional blocks. Steps may be added or deleted to methods described within the scope of the present disclosure.

While some embodiments have been illustrated and described in detail in the appended drawings and the foregoing description, such illustration and description are to be considered illustrative and not restrictive. Other variations to the disclosed embodiments can be understood and effected in practicing the claims, from a study of the drawings, the disclosure, and the appended claims. The mere fact that certain measures or features are recited in mutually different dependent claims does not indicate that a combination of these measures or features cannot be used. Any reference signs in the claims should not be construed as limiting the scope.

What is claimed is:

1. A method for separating sample components from a sample, the method comprising:
providing a field-flow fractionation device comprising:
an alternating current (AC) power source;
a channel comprising a sample inlet and a plurality of sample outlets;
a flow generator coupled to the channel and configured for translocating the sample components along the channel in a first direction from the sample inlet to the plurality of sample outlets;
an actuator coupled to the channel and configured for translocating the sample components via a direct current (DC) electric field in a second direction that forms a first angle with the first direction;
an array of electrodes arranged in a plurality of rows, wherein each row of the plurality of rows includes at least two of the electrodes; and
two sets of conductive interdigitated fingers aligned at a second angle with the first direction, wherein the second angle is different from the first angle and each finger of the two sets is electrically connected to a respective row of the plurality of rows of electrodes;
operating the AC power source to set adjacent rows of the array of electrodes at different AC potentials while every other row of the array of electrodes is set at the same AC potential;
operating the flow generator in such a way as to feed the sample to the sample inlet and cause the translocation of the sample components along the channel in the first direction from the sample inlet to the plurality of sample outlets;
operating the actuator so as to translocate the sample components in the second direction; and
collecting the sample components from the plurality of sample outlets.

2. The method of claim 1, wherein operating the flow generator comprises operating the flow generator such that feeding of the sample to the sample inlet continues at least until a part of the sample has reached the array of electrodes.

3. The method according to claim 1, wherein operating the flow generator comprises operating the flow generator such that feeding of the sample to the sample inlet continues at least until a part of the sample has reached the plurality of sample outlets.

4. The method according to claim 1, wherein the sample components comprise bioparticles.

5. The method according to claim 1, wherein the flow generator comprises a pump.

6. The method according to claim 1, wherein the first angle is within a range of 30° to 90°.

7. The method according to claim 1, wherein the array of electrodes comprises at least four rows.

8. The method according to claim 1, wherein the array of electrodes are made of doped silicon.

9. The method according to claim 1, wherein the array of electrodes have a height to width ratio within a range of 5 to 20.

10. The method according to claim 1, wherein adjacent electrodes belonging to adjacent rows within the array of electrodes are separated by a gap within a range of 1 µm to 50 µm.

11. The method according to claim 1, wherein adjacent electrodes belonging to adjacent rows within the array of electrodes are separated by a gap within a range of 5 µm to 20 µm.

12. The method according to claim 1, wherein each electrode of the array of electrodes has a resistance less than a resistance of the sample but greater than a resistance of electrical connections that electrically connect a plurality of rows of the array of electrodes.

13. The method according to claim 1, wherein the actuator comprises a pair of electrodes connected to a DC power source and positioned in such a way as to enable generation of an electric field in the second direction.

14. The method according to claim 1, wherein adjacent rows of the array of electrodes are arranged so that adjacent electrodes belonging to the adjacent rows are aligned in a direction forming a third angle with the first direction that is greater than 1° and less than 40°.

15. The method according to claim 1, wherein the actuator comprises an acoustic wave generator.

16. A field-flow fractionation device for separation of sample components, the device comprising:
a channel comprising a sample inlet and a plurality of sample outlets, the channel being configured for being coupled to a flow generator for translocating the sample components along the channel in a first direction from the sample inlet to the plurality of sample outlets;
an actuator coupled to the channel and configured for translocating the sample components via a direct current (DC) electric field in a second direction that forms a first angle with the first direction;
an array of electrodes arranged in a plurality of rows and comprising electrical connections configured for electrically connecting the array to an AC power source in such a way that adjacent rows of the array can be set at different AC potentials and every other row of the array can be set at the same AC potential, wherein each row of the plurality of rows includes at least two of the electrodes;
two sets of conductive interdigitated fingers aligned at a second angle with the first direction, wherein the second angle is different from the first angle and each finger of the two sets is electrically connected to a respective row of the plurality of rows of electrodes; and
a controller coupled to the actuator and configured for being additionally coupled to the AC power source, the controller being programmed to allow for simultaneous operation of the actuator and the AC power source.

17. The method of claim 1, wherein collecting the sample components from the plurality of sample outlets comprises collecting the sample components from the plurality of sample outlets while the sample components are moving in the first direction.

18. The field-flow fractionation device of claim 16, wherein the plurality of sample outlets are configured such that the sample components can exit the channel while moving in the first direction.

19. The field-flow fractionation device of claim 16, wherein the array of electrodes comprises at least four rows.

20. The field-flow fractionation device of claim 16, wherein adjacent rows of the array of electrodes are arranged so that adjacent electrodes belonging to the adjacent rows are aligned in a direction forming a third angle with the first direction that is greater than 1° and less than 40°.

* * * * *